US009748038B2

(12) United States Patent
Sato et al.

(10) Patent No.: US 9,748,038 B2
(45) Date of Patent: Aug. 29, 2017

(54) CONTACTLESS POWER SUPPLY MECHANISM AND SECONDARY COIL FOR CONTACTLESS POWER SUPPLY MECHANISM

(71) Applicant: Hosiden Corporation, Osaka (JP)

(72) Inventors: Eiji Sato, Osaka (JP); Hiroshi Ema, Osaka (JP)

(73) Assignee: Hosiden Corporation, Osaka (JP)

( * ) Notice: Subject to any disclaimer, the term of this patent is extended or adjusted under 35 U.S.C. 154(b) by 385 days.

(21) Appl. No.: 14/504,986

(22) Filed: Oct. 2, 2014

(65) Prior Publication Data

US 2015/0102688 A1 Apr. 16, 2015

(30) Foreign Application Priority Data

Oct. 10, 2013 (JP) ................................ 2013-213087

(51) Int. Cl.

| | |
|---|---|
| ***H01F 38/14*** | (2006.01) |
| ***H01F 27/38*** | (2006.01) |
| ***H01F 30/16*** | (2006.01) |
| ***H02J 17/00*** | (2006.01) |
| ***H02J 50/10*** | (2016.01) |

(52) U.S. Cl.

CPC ............. *H01F 38/14* (2013.01); *H01F 27/38* (2013.01); *H01F 30/16* (2013.01); *H02J 17/00* (2013.01); *H02J 50/10* (2016.02)

(58) Field of Classification Search

CPC .......... H01F 38/14; H01F 27/38; H01F 30/16; H02J 50/10; H02J 17/00

See application file for complete search history.

(56) References Cited

U.S. PATENT DOCUMENTS 4,374,354 A * 2/1983 Petrovic ............... A61C 17/224 15/22.1
4,612,527 A 9/1986 Third et al.
5,506,560 A 4/1996 Takeuchi et al.
(Continued)

FOREIGN PATENT DOCUMENTS

CN 102360781 A 2/2012
JP 9238428 A 9/1997
(Continued)

*Primary Examiner* — Jared Fureman
*Assistant Examiner* — James Evans
(74) *Attorney, Agent, or Firm* — The Webb Law Firm

(57) ABSTRACT

In a contactless power supply mechanism, a power receiving unit for supplying power to an electric device includes a secondary coil and a power supplying unit for supplying power to the power receiving unit includes a primary coil. The primary coil includes a primary core formed of magnetic material and a length of winding wire wounded around the primary core. The secondary coil includes a bar-shaped secondary core formed of magnetic material, a length of winding wire wounded around the secondary core and a magnetic sheet attached to at least one of end faces of the secondary core. The magnetic sheet includes a close-contact portion placed in close-contact with the end face of the secondary core and a curved portion which extends outwards from the close-contact portion beyond an outer edge of the end face and whose normal line has a portion un-parallel with an axial direction of the secondary core.

2 Claims, 3 Drawing Sheets

(56) References Cited

U.S. PATENT DOCUMENTS

| | | | | |
|---|---|---|---|---|
| 5,661,391 | A * | 8/1997 | Ito | B60L 11/182 320/108 |
| 5,808,537 | A * | 9/1998 | Kondo | H01F 38/14 336/129 |
| 2007/0132538 | A1* | 6/2007 | Catalano | H01F 17/062 336/225 |
| 2012/0091950 | A1* | 4/2012 | Campanella | H02J 5/005 320/108 |
| 2013/0293191 | A1 | 11/2013 | Hidaka et al. | |

FOREIGN PATENT DOCUMENTS

| | | | |
|---|---|---|---|
| JP | 2002208814 | A | 7/2002 |
| JP | 2005137173 | A | 5/2005 |
| JP | 2012070557 | A | 4/2012 |
| JP | 2012199505 | A | 10/2012 |

* cited by examiner

CONTACTLESS POWER SUPPLY MECHANISM AND SECONDARY COIL FOR CONTACTLESS POWER SUPPLY MECHANISM

CROSS REFERENCE TO RELATED APPLICATION

This application is based on and claims priority under 35 U.S.C. Section 119 to Japanese Patent Application No. 2013-213087 filed on Oct. 10, 2013, the entire contents of which are incorporated herein by reference.

TECHNICAL FIELD

This disclosure relates to a contactless power supply mechanism and also to a secondary coil for use therein.

RELATED ART

Conventionally, a wireless electric device such as portable devices represented by a mobile phone incorporates a rechargeable battery, so that the device is power-charged with using a recharger, e.g. a cradle, an AC adapter, etc. With such recharging technique, power supply and charging are effected by bringing a contact on the electric device into contact with a contact on the charger, thus establishing electric conduction therebetween.

In recent years, a contactless power supply (no-contact power supply) technique is beginning to be adopted which effects power supply without such contact between the contacts. In this contactless power supply technique, as no contacts are exposed to the outside, there is no risk of contact failure, thus providing such advantages as readiness in realizing water-proof arrangement.

At present, for the contactless power supply arrangement, an electromagnetic induction technique, a wireless transmission technique and a magnetic field resonance technique are being employed. In the electromagnetic induction technique, a secondary coil is provided in an electric device, while a primary coil is provided in a power supplying device. For power supply from the power supplying device to the electric device, the power supplying device and the electric device are set such that the primary coil and the secondary coil are placed in opposition to each other. Then, as a current is supplied to the primary coil, magnetic fluxes are generated in the primary coil. And, these magnetic fluxes generate an electromotive force in the secondary coil by magnetic induction. With this, the electric device can receive power supply.

According to a conventional contactless power supply mechanism of the electromagnetic induction technique, as shown in Japanese Unexamined Patent Application Publication No. 2012-199505, the primary coil and the secondary coil are formed respectively as a planar coil in a spiral form. And, at the time of power supply, these coils are placed in opposition to each other.

Further, according to Japanese Unexamined Patent Application Publication No. 9-238428 and Japanese Unexamined Patent Application Publication No. 2005-137173, the secondary coil is provided in the form of a bar (arcuate shape) and opposed ends of this secondary coil are clamped by ends of the primary coil.

SUMMARY

With use of the planar coils disclosed in Japanese Unexamined Patent Application Publication No. 2012-199505; however, there would occur a problem of reduction in power supply efficiency due to positional displacement between the coils. Also, with the use of the coils having the configurations disclosed in Japanese Unexamined Patent Application Publication No. 9-238428 and Japanese Unexamined Patent Application Publication No. 2005-137173, the magnetic fluxes affecting the secondary coil are enhanced, but reduction in power supply efficiency can occur due to positional displacement or relative angular displacement between the coils.

According to one preferred embodiment of the invention, there is disclosed a contactless power supply mechanism having high power supply efficiency.

According to one embodiment, a contactless power supply mechanism relating to the present invention comprises:

a power receiving unit having a secondary coil and configured to supply power to an electric device; and power supplying unit having a primary coil and configured to supply power to the power receiving unit;

wherein the primary coil includes a primary core formed of magnetic material and a length of winding wire formed of conductive material and wound around the primary core;

the secondary coil includes a bar-shaped secondary core formed of magnetic material, a length of winding wire formed of conductive material and wound around the secondary core and a magnetic sheet attached to at least one of end faces of the secondary core; and the magnetic sheet includes a close-contact portion placed in close-contact with the end face of the secondary core and a curved portion which extends outwards from the close-contact portion beyond an outer edge of the end face and whose normal line has a portion un-parallel with an axial direction of the secondary core.

With the above-described arrangement, at an end face of the secondary core, there is provided a magnetic sheet comprised of a close-contact portion and a curved portion. Therefore, even when there occurs an angular displacement in the axial direction of the secondary core relative to the direction of magnetic fluxes generated by the primary core, magnetic fluxes which would be non-usable in the case of using a conventional secondary coil, also can be incident on the curved portion of the magnetic sheet and then flow into the secondary coil via the close-contact portion. Accordingly, even if the axial direction of the secondary core is rotated, i.e. angularly displaced relative to the direction of magnetic fluxes generated by the primary core, reduction in the power supply efficiency can be effectively prevented. With this, it becomes also possible to enhance the degree of freedom in the layout of the secondary coil relative to the primary coil.

According to one embodiment of the contactless power supply mechanism relating to the present invention, the primary core includes a pair of opposing portions configured to have respective axes thereof parallel with each other and forming a gap therebetween;

the secondary coil, under a power supply state, is disposed between the pair of opposing portions; and the magnetic sheet is attached to both of the end faces of the secondary core.

With the above-described arrangement, it is possible not only to enhance the magnetic fluxes affecting the secondary coil, but also to restrict reduction in power supply efficiency due to angular displacement of the axial direction of the secondary core relative to the direction of magnetic fluxes generated by the primary core.

The shape of the curved portion can vary in many ways. However, if the curved portion has an arcuate shape in its lateral cross section, it is preferred that there always exist a portion to which magnetic fluxes can be incident perpendicularly, whatever an angular displacement may be. Further, if the curved portion is formed like a spherical face, restriction of power supply efficiency reduction is possible relative to various angular displacements.

According to an embodiment of the present invention, a secondary coil for a contactless power supply mechanism comprises:

a bar-shaped secondary core formed of magnetic material;

a length of winding wire formed of conductive material and wound around the secondary core; and a magnetic sheet attached to at least one of end faces of the secondary core; and wherein the magnetic sheet includes a close-contact portion placed in close-contact with the end face of the secondary core and a curved portion which extends outwards from the close-contact portion beyond an outer edge of the end face and whose normal line has a portion un-parallel with an axial direction of the secondary core.

To the above-described secondary coil too, the additional features provided in the contactless power supply mechanism described above can be applied similarly and similarly advantageous functions/effects can be achieved.

DESCRIPTION OF EMBODIMENTS

Figure 1:
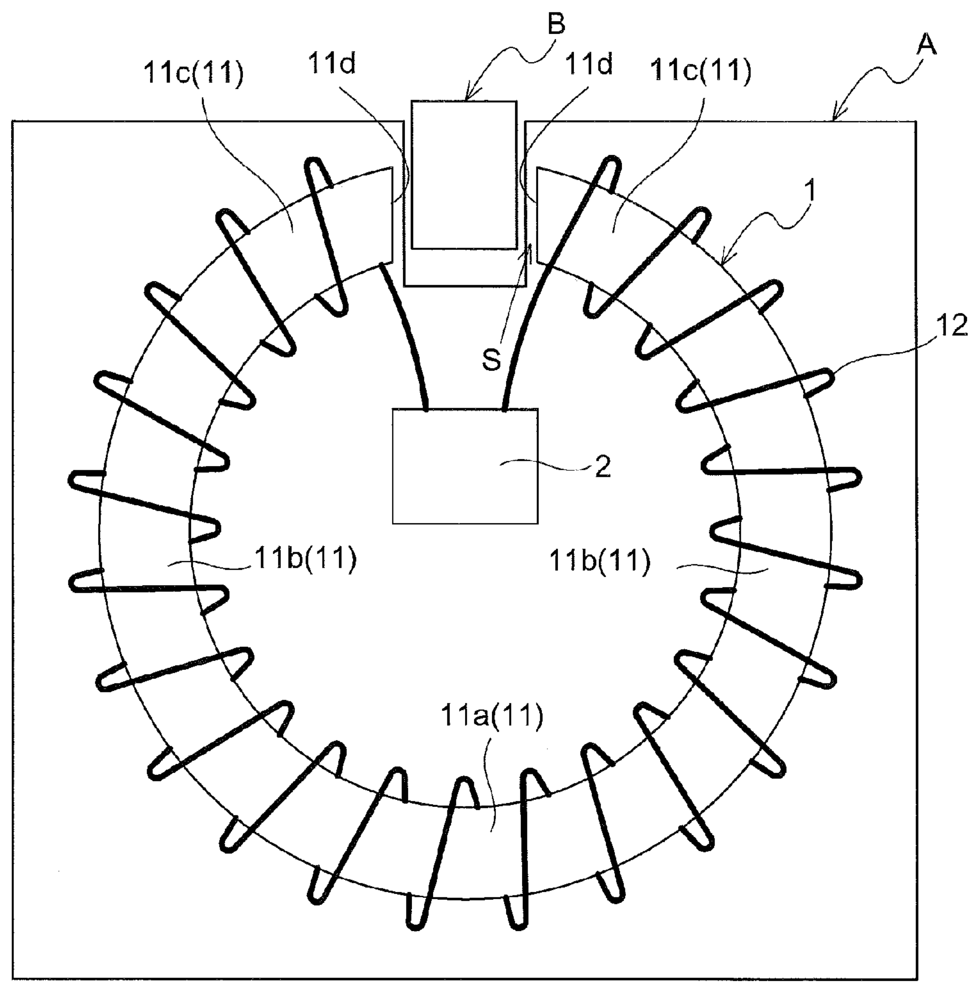
FIG. 1 is a schematic view showing a contactless power supply mechanism.

Next, with reference to the accompanying drawings, a contactless power supply mechanism according to this embodiment will be explained. FIG. 1 is a schematic view showing the contactless power supply mechanism according to the instant embodiment. As shown, the contactless power supply mechanism consists essentially of a power receiving unit B for supplying power to an electric device (not shown) and a power supplying unit A for supplying power to the power receiving unit B. The power supplying unit A is incorporated in e.g. a power supplying device such as a charger connected to a commercial power supply. On the other hand, the power receiving unit B is incorporated in an electric device such as a mobile phone, a portable terminal (PDA), an electric tooth brush, etc.

[Power Supplying Unit]

The power supplying unit A includes a primary coil 1 and a power supplying circuit 2 for driving the primary coil 1 with power available from e.g. a commercial power supply. Further, the primary coil 1 includes a primary core 11 formed of a magnetic material such as ferrite and a length of winding wire 12 formed of a conductive material and wound around the primary core 11. The construction of the power supplying circuit 2 is well-known. Therefore, explanation thereof is omitted herein.

The primary core 11 in the instant embodiment includes a base portion 11*a*, a pair of extension portions 11*b* and a pair of opposing portions 11*c*. The pair of extension portions 11*b* extend from opposed ends of the base portion 11*a*, respectively to be opposed to each other. Further, the opposing portions 11*c* extend in approximate opposition to each other from the respective opposed ends of the extension portions 11*b*. Between end faces 11*d* of the pair of opposing portions 11*c*, a space S is formed. In this embodiment, the pair of end faces 11*d* are configured to be parallel and opposed to each other.

As shown, in the instant embodiment, all of the base portion 11*a*, the extension portions 11*b* and the opposing portions 11*c* have arcuate shapes and these are connected together in a smooth and continuous manner. Such primary core 11 described above can be manufactured by cutting away a portion of a toroidal core. Meanwhile, in order to allow the pair of end faces 11*d* to be disposed parallel and opposed to each other, the cutting work should be effected in such a manner that forward and rear portions across the cut portion are equal to each other and a cut section is formed parallel. If the primary core 11 is formed by cutting away a portion of a toroidal core as described above, the primary core 11 can be manufactured economically.

As described above, the pair of opposing portions 11*c* are configured to be opposed to each other. More particularly, these opposing portions 11*c* are configured such that respective axes thereof extend parallel to each other. Here, the term "parallel" is meant to be inclusive not only being exactly parallel, but also the respective axes intersecting at a small angle $\delta$.

Figure 2:
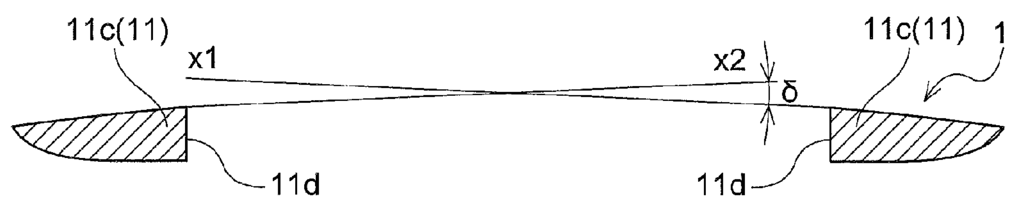
FIG. 2 is an enlarged view showing opposing portions of a primary coil.

FIG. 2 is an enlarged view showing the vicinity of the opposing portions 11*c* of the primary core 11. As described above, in this embodiment, the opposing portions 11*c* have arcuate shapes, so the axes thereof too have arcuate shapes. However, if each opposing portion is divided into small segments, the axial direction of each small segment can be approximated by a tangential direction in each small segment. For instance, the axial direction of the end face 11*d* corresponds to the tangential direction of the opposing portion 11*c* at the end face 11*d*. In FIG. 2, the tangential direction of the end face 11*d* is shown as the axial direction of the corresponding opposing portion 11*c*. As shown in FIG. 2, in the primary core 11 of this instant embodiment, the respective axes x1 and x2 of the pair of opposing portions 11*c* intersect at the small angle $\delta$. In such case as this too, the axes of the pair of opposing portions 11*c* will be considered "parallel" in the above-described context herein.

[Power Receiving Unit]

Figure 3:
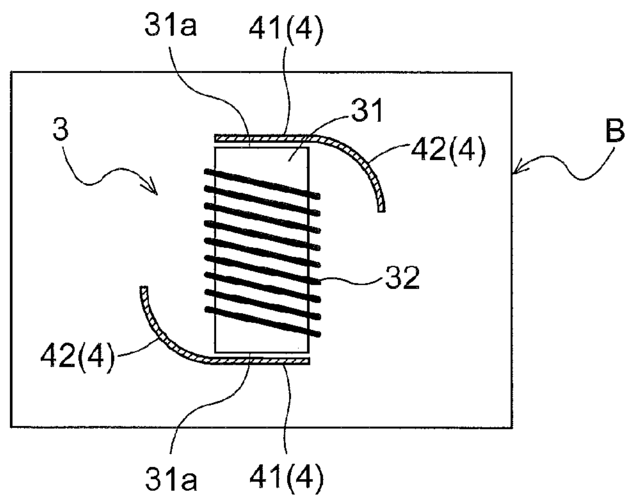
FIG. 3 is a schematic view of a power receiving unit.

Referring now to FIG. 3, the power receiving unit B includes a secondary coil 3 configured to generate an electromotive power based on magnetic fluxes generated by the primary coil 1. The secondary coil 3 is connected to a power supplying circuit (not shown) and the electromotive power of the secondary coil 3 is converted into an electric power by the power receiving circuit.

The secondary coil 3 includes a bar-shaped secondary core 31 formed of a magnetic material such as ferrite, a length of winding wire 32 formed of a conductive material and wound around the secondary core 31.

On end faces 31*a* constituting bottom faces of the secondary core 31, magnetic sheets 4 are provided. As shown, each magnetic sheet 4 includes a close-contact portion 41 placed in close-contact with the end face 31*a* of the secondary core 31 and a curved portion 42 which extends outwards from the close-contact portion 41 beyond an outer edge of the end face 31*a*. Incidentally, in the context of the present invention, the term "close-contact" is meant to be inclusive of not only a gapless arrangement (complete contact), but also an arrangement having a slight gap (e.g. a gap of 0.5 mm or less). Further, as shown, in this embodiment, the curved portion 42 has an arcuate cross section as seen laterally.

In a contactless power supply mechanism, in order to enhance its power supply efficiency, it is necessary to increase the amount of magnetic fluxes passing through the second core 31. For this reason, in the case of using a conventional secondary core 3 having no magnetic sheet(s) 4 or a secondary core 3 having the close-contact portion 41 alone, the power supply efficiency will be maximum when the axial direction of the second core 31 (the direction perpendicular to the end face 31*a*) and the axial direction of the corresponding opposing portion 11*c* of the primary core 11 (the direction of magnetic fluxes) are parallel to each other. When this parallel relationship is lost, there will occur sharp reduction in the power supply efficiency. More particularly, if the axial direction of the secondary core 31 is angularly displaced relative to the axial direction of the opposing portion 11*c* of the primary core 11, such sharp reduction in power supply efficiency will occur. Incidentally, in the following explanation, a term "rotational angle" means a rotational angle formed by the axial direction of the secondary core 31 relative to the axial direction of the corresponding opposing portion 11*c* of the primary core 11. And, a language "the rotational angle is 0 degree" means that the axial direction of the secondary core 31 is parallel to the axial direction of the opposing portion 11*c* of the primary core 11.

Figure 4:
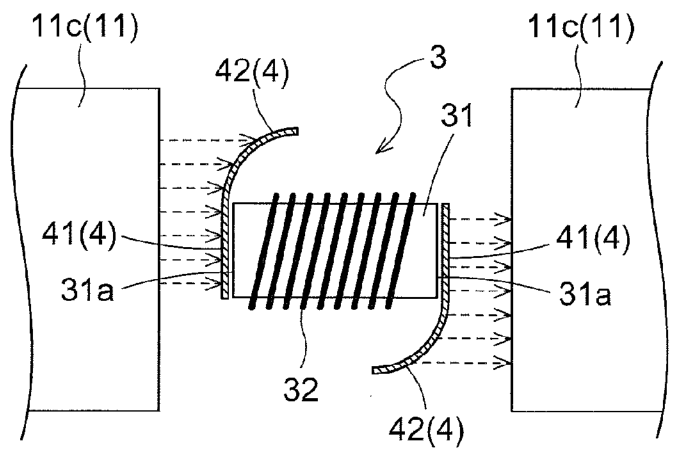
FIG. 4 is a view for explaining influence of a positional displacement (angular) of a secondary coil relative to a primary coil.
Figure 5:
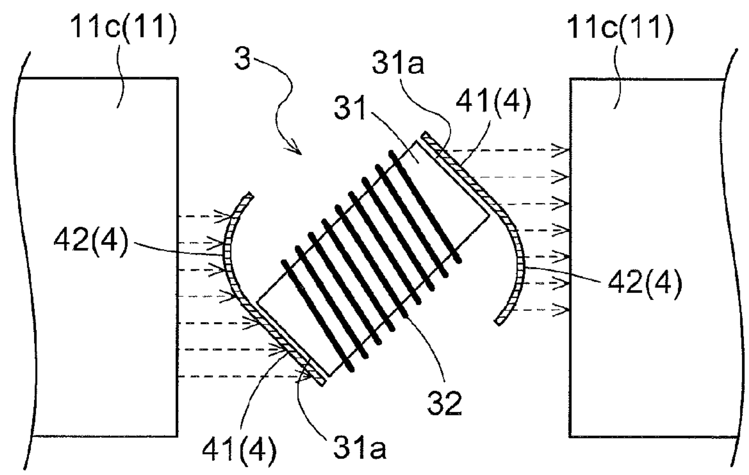
FIG. 5 is a view for explaining influence of a positional displacement (angular) of a secondary coil relative to a primary coil.
Figure 6:
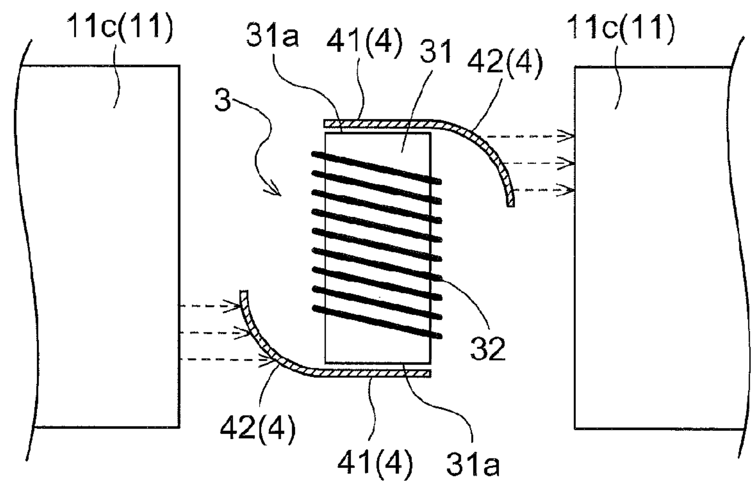
FIG. 6 is a view for explaining influence of a positional displacement (angular) of a secondary coil relative to a primary coil.

On the other hand, according to the contactless power supply mechanism of the instant embodiment, as shown in FIG. 4, like the conventional secondary coil described above, the power supply efficiency can be made maximal when the axial direction of the secondary core 31 is rendered parallel to the axial direction of the opposing portion 11*c* of the primary core 11. Moreover, as illustrated in FIG. 5 and FIG. 6, even when the axial direction of the secondary core 31 of the secondary coil 3 is angularly displaced relative to the axial direction of the opposing portion 11*c* of the primary core 11, the magnetic fluxes can still be incident on the curved portion 42 of the magnetic sheet 4. Then, these magnetic fluxes incident on the curved portion 42 will flow from this curved portion 42 to the close-contact portion 41 and then to the secondary core 31 and still then to the other magnetic sheet 4 placed in close-contact with this secondary core 31. Meanwhile, in order to allow the magnetic sheet 4 to receive the magnetic fluxes in an efficient manner, it is desired that the magnetic fluxes are incident on the magnetic sheet 4 perpendicularly. In this regard, as the curved portion 42 in the instant embodiment has an arcuate lateral cross section, the curved portion 42 has some part on which the magnetic fluxes are incident on the magnetic sheet 4 (curved portion 42) perpendicularly. Therefore, with use of this magnetic sheet 4 of the instant embodiment, reduction in the power supply efficiency can be effectively restricted even when the axial direction of the secondary core 31 is angularly displaced relative to the axial direction of the opposing portion 11*c* of the primary core 11.

Incidentally, the range of the rotational angle capable of restricting power supply efficiency reduction depends on a magnitude of the center angle of the curved portion 42. For instance, supposing the curved portion 42 has a center angle of 90 degrees, even if the axial direction of the secondary core 31 is displaced in a range from 0 to 90 degrees relative to the axial direction of the opposing portion 11*c* of the primary core 11, no such conspicuous power supply efficiency reduction as would occur with the conventional secondary coil will occur.

As described above, according to the instant embodiment, as the magnetic sheet 4 comprised of the close-contact portion 41 and the curved portion 42 is placed in close-contact with the end face 31*a* of the secondary core 31 of the secondary coil 3, reduction in the power supply efficiency can be restricted and at the same time the degree of freedom in the layout of the secondary coil 3 relative to the primary coil 1 can be enhanced.

Figure 7:
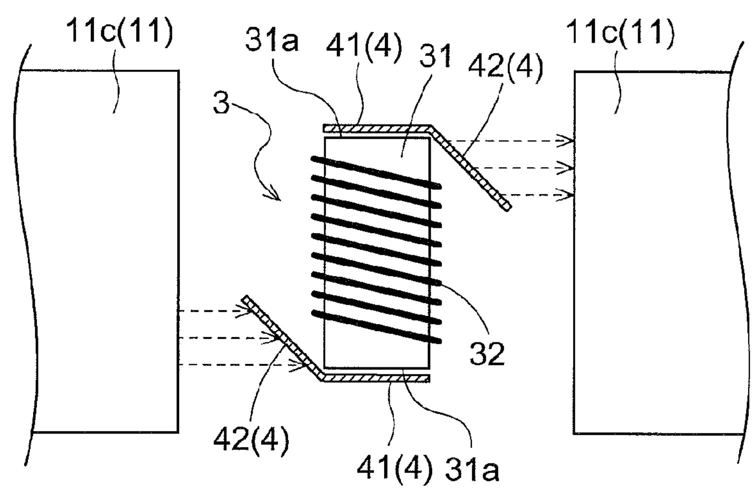
FIG. 7 is a view showing layout of a magnetic sheet relative to a secondary coil in a further embodiment.
Figure 8:
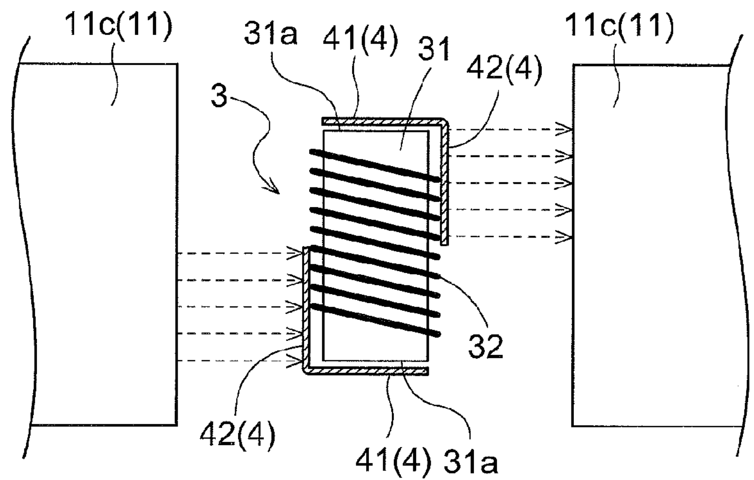
FIG. 8 is a view showing layout of a magnetic sheet relative to a secondary coil in a further embodiment.

FIGS. 7 and 8 show the secondary coil 3 having magnetic sheets 4 of different configurations. In the magnetic sheets 4 shown in FIGS. 7 and 8, the close-contact portion 41 and the curved portion 42 both are formed of flat faces, but the normal line of the close-contact portion 41 and the normal line of the curved portion 42 are not parallel. More particularly, the curved portion 42 is bent relative to the close-contact portion 41. Incidentally, of angles (interior and exterior) formed between the close-contact portion 41 and the curved portion 42, the smaller one will be referred to as "a bent angle". That is, the bent angle of the magnetic sheet 4 shown in FIG. 7 is an acute angle, whereas the bent angle of the magnetic sheet 4 shown in FIG. 8 is a right angle.

In the case of using the magnetic sheets 4 having the above-described configurations, the power supply efficiency is maximal when the rotational angle=(180 degrees—the bent angle). As the rotational angle varies from (180 degrees—the bent angle), the efficiency will be reduced. However, regarding the power supply efficiency in the case of occurrence of angular displacement of the axial direction of the secondary core 31 relative to the axial direction of the opposing portion 11*c* of the primary core 11, the efficiency will be higher in the case of using the magnetic sheets 4 having the above configurations than the case of using the conventional secondary coil 3. Namely, in the case of using the magnetic sheets 4 having these configurations, reduction in power supply efficiency can be restricted, in comparison with the conventional secondary coil 3, even if the axial direction of the secondary core 31 is angularly displaced relative to the axial direction of the opposing portion 11*c* of the primary core 11.

OTHER EMBODIMENT

In the foregoing embodiment, the primary core 11 includes a pair of opposing portions 11*c* forming therebetween a space, in which space the secondary coil 3 is disposed. Instead, the primary core 11 may be provided in the form of a bar, just like the secondary core 31 and this primary core 1 and the secondary core 3 may be disposed in opposition to each other. In this case, if the magnetic sheet 4 is provided on at least one end face 31*a* of the secondary core 31, the above-described advantageous function/effect can be achieved.

The invention claimed is:

1. A contactless power supply mechanism comprising:

a power receiving unit having a secondary coil and configured to supply power to an electric device; and a power supplying unit having a primary coil and configured to supply power to the power receiving unit;

wherein the primary coil includes a primary core formed of magnetic material and a length of winding wire formed of conductive material and wound around the primary core;

the secondary coil includes a bar-shaped secondary core formed of magnetic material, a length of winding wire formed of conductive material and wound around the secondary core and a magnetic sheet attached to at least one of end faces of the secondary core; and the magnetic sheet includes a close-contact portion placed in close-contact with the end face of the secondary core and a curved portion which extends outwards from the close-contact portion beyond an outer edge of the end face and whose normal line has a portion un-parallel with an axial direction of the secondary core, wherein:

the primary core includes a pair of opposing portions configured to have respective axes thereof parallel with each other and forming a gap therebetween;

the secondary coil, under a power supply state, is disposed between the pair of opposing portions; and the magnetic sheet is attached to both of the end faces of the secondary core.

2. The contactless power supply mechanism according to claim 1, wherein the curved portion has an arcuate shape in its lateral cross section.

* * * * *